US010185029B2

(12) United States Patent
Suarez

(10) Patent No.: US 10,185,029 B2
(45) Date of Patent: Jan. 22, 2019

(54) TIMING AND SYNCHRONIZATION OF RADIO WAVES FOR SCANNING, DETECTION, AND MEASUREMENT OF SURFACE NON-UNIFORMITY

(71) Applicant: The United States of America, as represented by the Secretary of the Army, Washington, DC (US)

(72) Inventor: John Suarez, Brooklyn, NY (US)

(73) Assignee: The United States of America, as represented by the Secretary of the Army, Washington, DC (US)

( * ) Notice: Subject to any disclaimer, the term of this patent is extended or adjusted under 35 U.S.C. 154(b) by 442 days.

(21) Appl. No.: 15/054,268

(22) Filed: Feb. 26, 2016

(65) Prior Publication Data

US 2017/0248695 A1 Aug. 31, 2017

(51) Int. Cl.
| | |
|---|---|
| *G01S 13/00* | (2006.01) |
| *G01S 13/87* | (2006.01) |
| *G01S 13/93* | (2006.01) |
| *G01S 7/41* | (2006.01) |
| *B60K 31/00* | (2006.01) |

(52) U.S. Cl.
CPC ........ *G01S 13/003* (2013.01); *B60K 31/0008* (2013.01); *G01S 7/41* (2013.01); *G01S 13/878* (2013.01); *G01S 13/931* (2013.01); *G01S 2013/9375* (2013.01)

(58) Field of Classification Search
CPC .......... G01S 13/931; G01S 2013/9375; G01S 2007/4039; G01S 2013/9389; G01S 13/003; G01S 2013/9321; G01S 2013/9346; G01S 2013/9385; G01S 13/32; G01S 13/885; G01S 7/412; G01S 13/878; G01S 7/41; H01Q 1/3233; H01Q 1/3283

See application file for complete search history.

(56) References Cited

U.S. PATENT DOCUMENTS

| 6,147,638 | A | * | 11/2000 | Rohling | G01S 13/28 342/104 |
|---|---|---|---|---|---|
| 8,681,036 | B2 | * | 3/2014 | Beer | G01S 13/90 342/22 |

(Continued)

FOREIGN PATENT DOCUMENTS

WO WO-9848296 A1 * 10/1998 ............. G01S 7/024

OTHER PUBLICATIONS

Balakuntala et al.; An Intelligent System to Detect, Avoid and Maintain Potholes: A Graph Theoretic Approach; arxiv.org/pdf/1305.5522; Accessed on Dec. 15, 2014.

(Continued)

*Primary Examiner* — Olumide Ajibade Akonai
(74) *Attorney, Agent, or Firm* — Ronald Krosky; Azza Jayaprakash

(57) ABSTRACT

Various embodiments that pertain to surface non-uniformity detection through use of radio waves are described. A vehicle can transmit radio waves to an area the vehicle is traveling to, such as a road in front of an automobile. The automobile can receive and process returned radio waves to determine if the road has a non-uniformity, such as a significant pothole or speed bump. If the road has the non-uniformity, then a driver of the automobile can be alerted so the driver can decide if evasive action should be taken and take such action if appropriate.

20 Claims, 17 Drawing Sheets

(56) References Cited

U.S. PATENT DOCUMENTS

| | | |
|---|---|---|
| 2005/0116854 A1* | 6/2005 | Beez .................... G01S 7/4026 342/70 |
| 2006/0017807 A1 | 1/2006 | Lee et al. |
| 2006/0022866 A1* | 2/2006 | Walton ................... G01S 7/352 342/194 |
| 2009/0051581 A1 | 2/2009 | Hatono |
| 2010/0052971 A1* | 3/2010 | Amarillas ............. G01S 13/885 342/22 |
| 2010/0097456 A1 | 4/2010 | Zhang et al. |
| 2010/0121577 A1 | 5/2010 | Zhang et al. |
| 2011/0291877 A1 | 12/2011 | Habboosh et al. |
| 2013/0038484 A1 | 2/2013 | Ohkado et al. |
| 2013/0096731 A1 | 4/2013 | Tamari et al. |
| 2013/0250046 A1 | 9/2013 | Schofield et al. |
| 2014/0104424 A1 | 4/2014 | Zhang et al. |
| 2014/0168001 A1* | 6/2014 | Agnew ................. G01S 13/931 342/27 |
| 2015/0168546 A1 | 6/2015 | Nakagawa et al. |
| 2015/0212198 A1 | 7/2015 | Nishio et al. |
| 2015/0336546 A1 | 11/2015 | Al-Zahrani |
| 2017/0131400 A1* | 5/2017 | Feng ..................... G01C 21/32 |

OTHER PUBLICATIONS

Rode, et al.; Pothole Detection and Warning System using Wireless Sensor Networks; http://www.ee.washington.edu/research/nsl/aar-cps/PrakharGoyal-20081021025613.pdf; Accessed on Dec. 15, 2014.

* cited by examiner

TIMING AND SYNCHRONIZATION OF RADIO WAVES FOR SCANNING, DETECTION, AND MEASUREMENT OF SURFACE NON-UNIFORMITY

GOVERNMENT INTEREST

The innovation described herein may be manufactured, used, imported, sold, and licensed by or for the Government of the United States of America without the payment of any royalty thereon or therefor.

BACKGROUND

While driving an automobile, a driver can strive to have as smooth of a ride as possible. To achieve such a ride, the driver can select a route with roads that are better maintained than alternative routes. However, even the route with the better maintained roads can have road non-uniformities that result from use, such as potholes, or result from design, such as a speed bump. The driver can attempt to avoid or minimize impact of these non-uniformities, such as by slowing down when seeing or approaching the speed bump. If visibility is poor, then the driver may not be able to avoid or minimize impact of the non-uniformities on his or her own.

SUMMARY

In one embodiment, a system comprises a signal generator and an antenna set. The signal generator can be configured to generate a signal. The antenna set can be configured to transmit a transmitted version of the signal and receive a reflected version of the signal. The transmitted version, after transmission, can propagate, at least in part, along a ground. The reflected version can be a reflection of the transmitted version contacting a non-uniformity of the ground.

In another embodiment, a system comprises a first antenna and a second antenna. The first antenna, resident on a vehicle, can output a radio wave set while the vehicle is in travel. The second antenna can collect at least part of the radio wave set after the radio wave set returns, after being output, from interaction with a non-uniformity of a surface. The radio wave set, at least in part, propagates along the surface after being outputted.

In yet another embodiment, a method comprises emitting a first incident radio wave that propagates along a surface and emitting a second incident radio wave that propagates along the surface. The method also comprises receiving a first reflected radio wave that is a reflection of the first incident radio wave and receiving a second reflected radio wave that is a reflection of the second incident radio wave. The method additionally comprises determining if the surface has a non-uniformity through use of the first incident radio wave, the second incident radio wave, the first reflected radio wave, and the second reflected radio wave. The first reflected radio wave is received after the first incident radio wave is emitted and after the second incident radio wave is emitted and the second reflected radio wave is received after the first incident radio wave is emitted and after the second incident radio wave is emitted.

BRIEF DESCRIPTION OF THE DRAWINGS

Incorporated herein are drawings that constitute a part of the specification and illustrate embodiments of the detailed description. The detailed description will now be described further with reference to the accompanying drawings as follows.

DETAILED DESCRIPTION

Figure 1A:
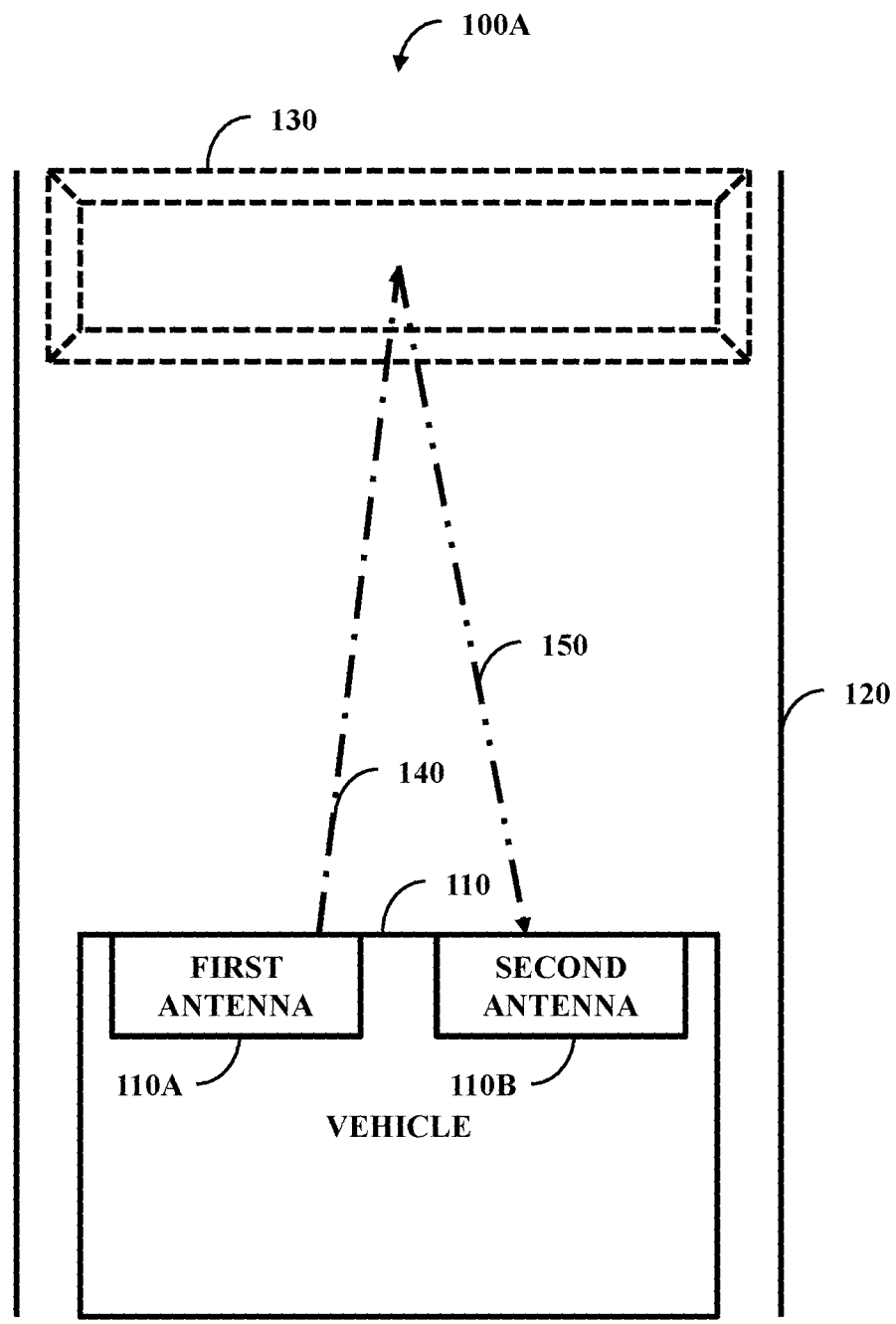
FIGS. 1A-1E illustrates five embodiments of a driving environment.

In one embodiment, an automobile can travel on a road. The road may have non-uniformities such as a change in surface type, a pothole, or a speed bump. In good visibility while attentively driving, a driver of the automobile can see these non-uniformities and respond appropriately such as by swerving or slowing down. However, visibility may be poor, the driver may not be driving attentively, or another circumstance may prevent the driver from seeing and in turn responding to the non-uniformity in an appropriate amount of time.

To improve driving, radio waves can be sent from the automobile to the road ahead. The automobile can receive reflections of the radio waves and process those reflections to determine if a non-uniformity exists. If the non-uniformity does exist, then how the automobile is driven can be altered.

The following includes definitions of selected terms employed herein. The definitions include various examples. The examples are not intended to be limiting.

"One embodiment", "an embodiment", "one example", "an example", and so on, indicate that the embodiment(s) or example(s) can include a particular feature, structure, characteristic, property, or element, but that not every embodiment or example necessarily includes that particular feature, structure, characteristic, property or element. Furthermore, repeated use of the phrase "in one embodiment" may or may not refer to the same embodiment.

"Computer-readable medium", as used herein, refers to a medium that stores signals, instructions and/or data. Examples of a computer-readable medium include, but are not limited to, non-volatile media and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, other optical medium, a Random Access Memory (RAM), a Read-Only Memory (ROM), a memory chip or card, a memory stick, and other media from which a computer, a processor or other electronic device can read. In one embodiment, the computer-readable medium is a non-transitory computer-readable medium.

"Component", as used herein, includes but is not limited to hardware, firmware, software stored on a computer-readable medium or in execution on a machine, and/or combinations of each to perform a function(s) or an action(s), and/or to cause a function or action from another component, method, and/or system. Component may include a software controlled microprocessor, a discrete component, an analog circuit, a digital circuit, a programmed logic device, a memory device containing instructions, and so on. Where multiple components are described, it may be possible to incorporate the multiple components into one physical component or conversely, where a single component is described, it may be possible to distribute that single component between multiple components.

"Software", as used herein, includes but is not limited to, one or more executable instructions stored on a computer-readable medium that cause a computer, processor, or other electronic device to perform functions, actions and/or behave in a desired manner. The instructions may be embodied in various forms including routines, algorithms, modules, methods, threads, and/or programs including separate applications or code from dynamically linked libraries.

FIGS. 1A-1E illustrate five embodiments of a driving environment 100A-100C. A vehicle 110 (e.g., automobile, motorcycle, boat, bicycle, skis, running shoes, etc.) can drive on a surface 120 (e.g., paved road, dirt road, water, etc.). The surface 120 can have a non-uniformity 130 (e.g., speed bump, pothole, ice and/or black ice, wave, etc.). The non-uniformity 130 can also be a change in surface type, such as from a concrete road to an asphalt road. If the vehicle 110 travels over the non-uniformity 130 at all, travels over the non-uniformity 130 at an undesirable speed (e.g., too fast), travels over the non-uniformity 130 at an undesirable angle, etc., then a negative outcome can occur. Examples of the negative outcome can include one or more disruptions for the driver, injury to the driver, damage to the vehicle 110, harm to the surface 120, or destruction of the non-uniformity 130.

Figure 1B:
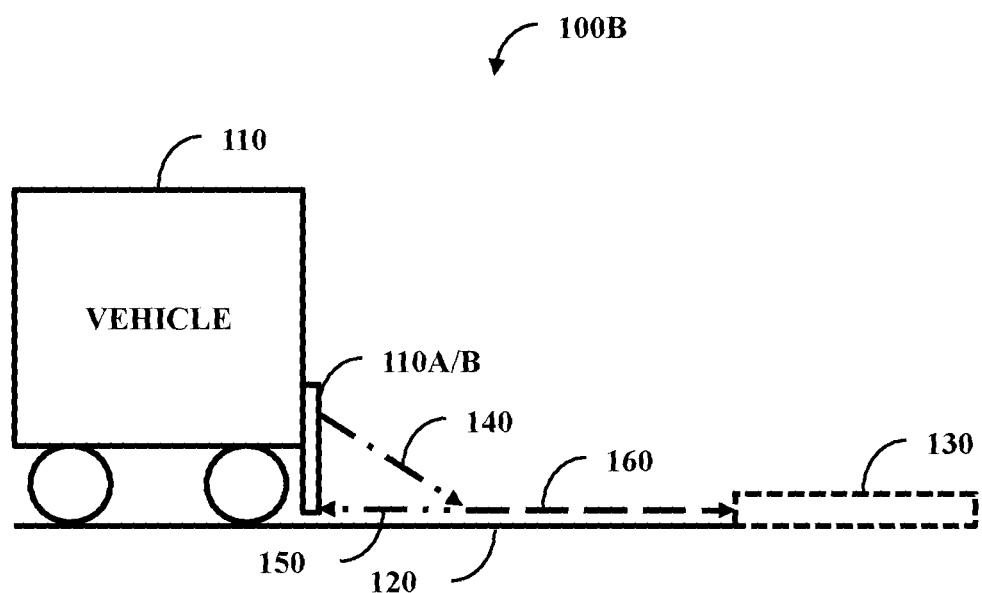

To try to minimize and/or eliminate the negative outcome, the vehicle 110 can transmit a transmission radio wave 140 to the surface 120. The transmission radio wave 140 can be transmitted directly ahead of the vehicle 110 toward a direction of travel for the vehicle 110. The transmission radio wave 140 can impact the surface 120 and be reflected back as a reflected radio wave 150 as illustrated in FIG. 1A. The transmission radio wave 140 can propagate along the surface 120, as illustrated in FIG. 1B (above view in FIG. 1A and side view in FIG. 1B). In FIG. 1B, the transmission radio wave 140 can be emitted by the antenna 110A (illustrated as 110A/B along with antenna 110B since, in the illustrated embodiment, the profile of individual antennas 110A and 110B can be indistinguishable). The transmission radio wave 140 can impact the non-uniformity 130 and reflect back as the reflected radio wave 150 (a combined radio wave 160 can include overlap of waves 140 and 150 since those waves can travel along the same path at least partially). The transmission radio wave 140 can drop to the surface 120 due its wavelength and continue on the surface 120 after being reflected. The transmission radio wave 140 and its reflected radio wave 150 can be such that many features from hills are not set off as non-uniformities due to their subtle nature.

Figure 1C:
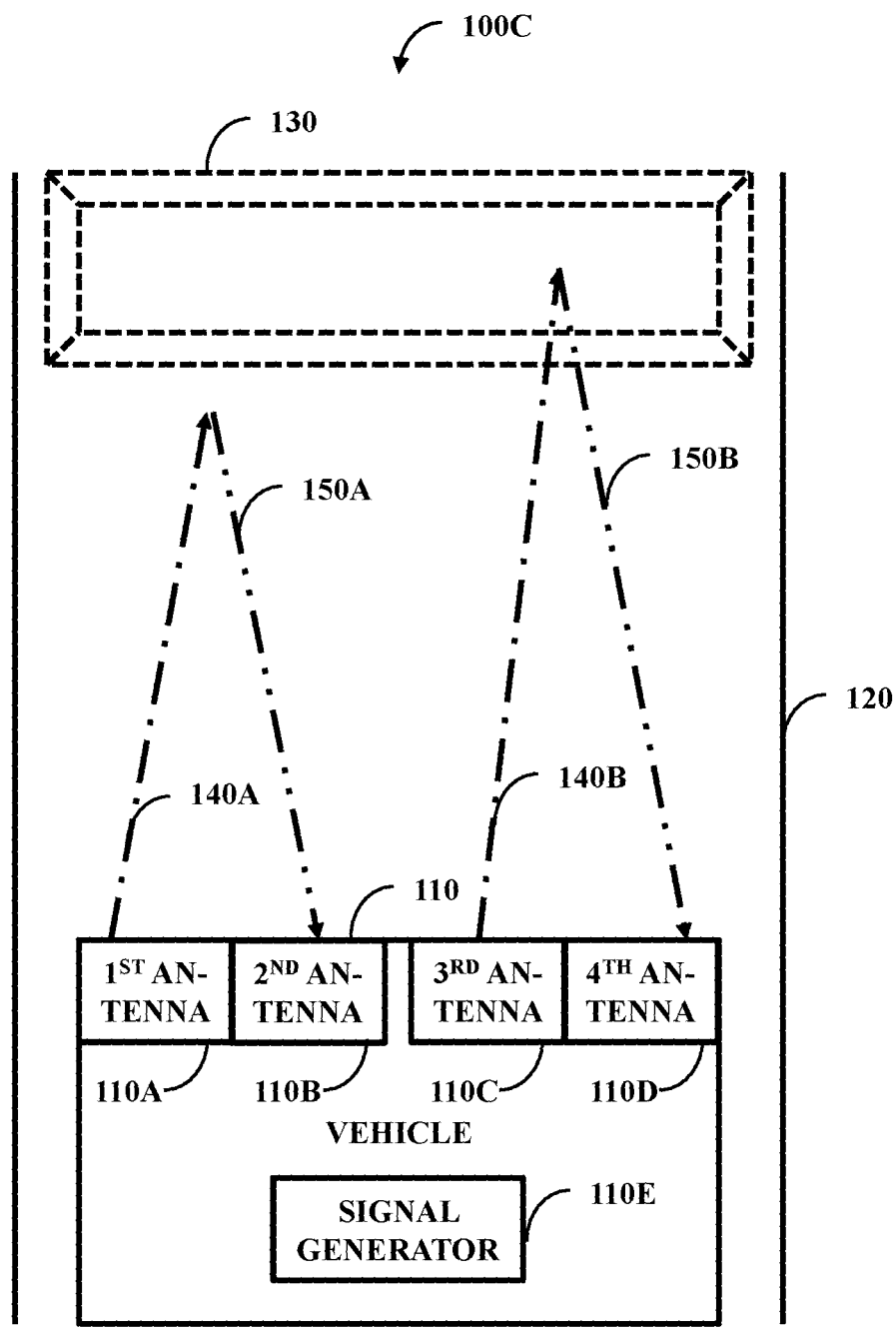

This propagation can be produced through use of a relatively longer-frequency radio wave since longer-frequency radio waves travel closer to the surface than relatively shorter-frequency radio waves. The transmission radio wave 140 can be a singular wave that transmits to a singular point as illustrated in FIG. 1A as well as be a non-singular wave as illustrated in FIGS. 1C and 1D (above view in FIG. 1C and side view in FIG. 1D).

Figure 1D:
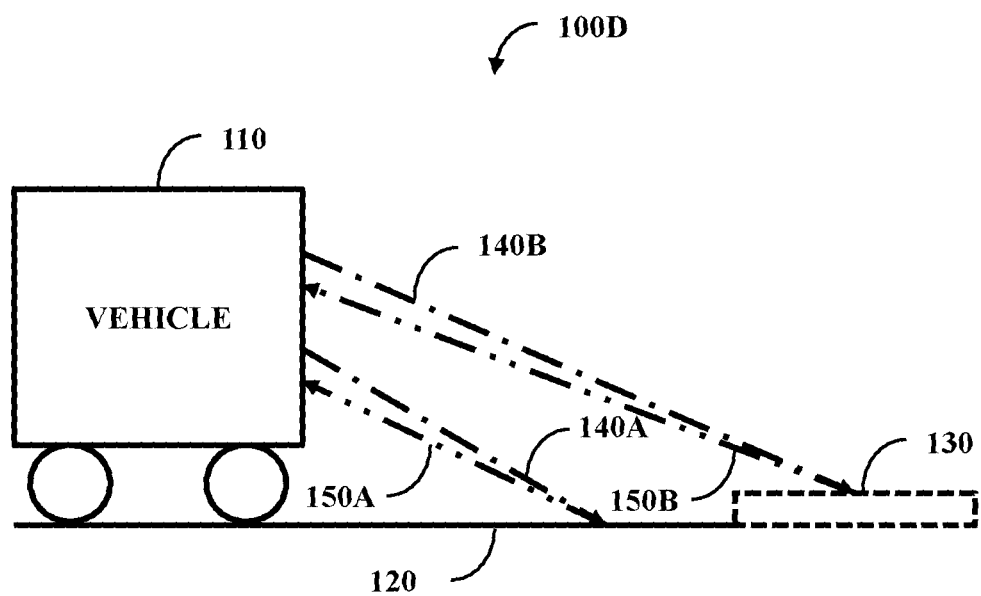

While not shown, the waves 140A, 140B, 150A, and 150B of FIG. 1D can propagate along the surface 120. In one example, the waves 140A and 140B can be transmitted at different frequencies to cause then to fall to different height levels of the surface 120. This way, a general height of the non-uniformity 130 can be determined (e.g., and used for threshold purposes discussed below).

With the singular wave, the transmission wave 140 is sent out to a single location and the reflected wave 150 is returned as an echo derived from the transmitted wave's reflection off the surface 120. In one example, the reflected wave 150 can be subtracted from the transmission wave 140, or vice versa, and the difference can be used as a baseline from which the non-uniformity is determined. The transmission wave 140 can be continuously transmitted and in turn a reflected wave 150 can be continuously received with differences being calculated. If a discrepancy exists between differences, then an inference can be drawn that the non-uniformity 130 exists.

With the non-singular wave, multiple transmission waves, such as two transmission waves 140A and 140B, can be transmitted to different locations of the surface 120 and at least some of these waves can be reflected back, such as the reflected waves 150A and 150B. These transmission waves 140A and 140B can be of the same frequency or be of different frequencies. The transmission waves 140A and 140B can be aimed to different parts of the surface (e.g., differing along the x-axis and/or differing along the y-axis) and reflections of these waves can be received by the vehicle 110. The vehicle 110 can compare these reflections against one another to determine the existence of the non-uniformity 130 on the surface 120.

In one example, the transmission radio wave 140 can be two radio waves: one at a low frequency (e.g., in the Very High Frequency or Ultra High Frequency range, such as below 1 GHz) and one at a high frequency (e.g., above 10 GHz) or otherwise considered a high wavelength and a low wavelength, respectively. These two waves can be sent to a single location. The low frequency wave can be used to make sure a wave is not obstructed and the high frequency wave can be used to have higher sensitivity to the non-uniformity 130 (e.g., detect smaller non-uniformity). A component of the vehicle 110 or other component can use returns of both waves to process the non-uniformity 130 as well as process the non-uniformity with return of a single wave.

In one embodiment, the component of the vehicle 110 or other component can be used to compensate for various travel realities of the vehicle. In one example, the component can be calibrated such that some non-uniformities are ignored. For example, tires of cars can be ignored, such as by excluding non-uniformities that reach maximum height or depth (e.g., an inference is drawn that instead of being a non-uniformity of a road, the response is from another vehicle). In one example, the vehicle 110 can be travelling toward the non-uniformity 130 along the surface 120 and therefore the transmission radio wave 140 is transmitted from a different location than the reflected radio wave 150 is received. The component of the vehicle 110 or other component can be configured to compensate for this movement in processing the waves and ultimately detecting the non-uniformity 130.

Aspects disclosed herein can relate to the field of radio wave scanning, detection, and measurement. In accordance with these aspects, radio waves can be applied to determine, from a safe distance, a presence of the non-uniformity 130 in the surface 120. The non-uniformity 130 can be due to, for example, terrain, debris, or an intentionally-placed object. Aspects disclosed herein can lend themselves to military and commercial applications. One possible military application is detection of a mine that is directly ahead of an approaching vehicle. One possible commercial application is for the automotive industry—as an after-market or built-in module for detecting potholes. In either case, aspects could be used to detect the non-uniformity 130 of the surface 120 ahead of the vehicle 110 and notify the occupant of the non-uniformity 130 through use of the transmission radio wave 140.

In one embodiment, a first ($1^{st}$) antenna 110A and a second ($2^{nd}$) antenna 110B can be resident on the vehicle 110 (or resident elsewhere). Resident on the vehicle 110 can include being installed on the vehicle 110, being attached to the vehicle 110, being attached to a person riding the vehicle 110 (e.g., be on a helmet of a skier), as well as other associations with the vehicle 110. The first antenna 110A can output a radio wave set (e.g., one or more radio waves, such as the transmission wave 140) while the vehicle 110 is in travel. After being outputted, the radio wave set can propagate along the surface 120 (e.g., until reaching the non-uniformity 130). The second antenna 110B can collect at least part of the radio wave set after the radio wave set returns (e.g. the reflected wave 150), after being output, from interaction with a non-uniformity 130 of the surface 120. While being shown as two antennas, it is to be appreciated that functionality of the first antenna 110A and the second antenna 110B can take place on one antenna resident on the vehicle 110 (e.g., the first antenna 110A and the second antenna 110B can be the same antenna)

Also resident on the vehicle 110 can be various components, such as a timer component, a regulation component, an identification component, a standard component, and/or a notification component. The timer component (e.g., implemented as a microcontroller unit using a time-division multiplexing scheme) can time output of the radio wave set such that output of the radio wave set does not overlap with collection of at least part of the radio wave set. In one example, the timer component can instruct the first antenna 110A to emit radio waves from $T_0$ to $T_{1/2}$ exclusive and instruct the second antenna 110B to collect radio waves from $T_{1/2}$ to $T_1$, with $T_1$ being the same as $T_0$ to complete a timing cycle. This can minimize interference as transmission and collection of radio waves do not take place concurrently.

The regulation component can regulate a number of radio waves in the radio wave set, such that the radio wave set is outputted before the second antenna 110B collects at least part of the radio wave set. It can be beneficial for the vehicle 110 to transmit as many radio waves as possible. The more radio waves transmitted, then the more data points available. The more data points available, then the more accurately it can be determined if a non-uniformity exists. However, as radio waves are sent out, the radio waves reflect off the surface and output and reception of waves simultaneously can cause interference. Therefore, the regulation component can determine how many waves can be sent out before an expected return and limit the number of waves sent out to that number. Further, the regulation component can cause more radio waves to be outputted once radio wave returns are received from a previous session.

In one embodiment, the identification component can identify the non-uniformity 130 of the surface 120 through analysis of at least part of the radio wave set after the radio wave set returns from interaction with the non-uniformity 130 of the surface 120 against the radio wave set at output. The standard component can determine if the non-uniformity 130 of the surface 120 meets a standard of significance after the non-uniformity 130 of the surface 120 is identified. The notification component can output a notification of the non-uniformity 130 of the surface 120 after the non-uniformity of the ground is determined to meet the threshold. In one example, the notification is outputted from an audio speaker of the vehicle 110.

In one embodiment, a signal generator 110E can reside on the vehicle and can be configured to generate a signal (e.g., a radio wave). An antenna set (e.g., the first antenna through fourth antenna 110A-110D) can be configured to transmit a transmitted version of the signal (e.g., transmission wave 140) and receive a reflected version of the signal (e.g., reflected wave 150). While illustrated as four antennas, the antenna set can be configured as one or more antennas that propagate and receive one or more signal versions. In one example, multiple radio waves (e.g., at different frequencies) can be outputted from the first antenna 110A and multiple radio waves can be returned to the second antenna 110B (including radio waves not emitted by the second antenna 110B). The transmitted version, after transmission, can propagate along a ground (e.g., the surface 120). With this, the ground can function as a waveguide substrate for the signal. The reflected version can be a reflection of the transmitted version contacting the non-uniformity 130 of the ground and, in one embodiment, the reflected signal can also propagate along the ground.

In FIG. 1D, the transmitted version of the signal can be considered a first transmitted version of the signal and the reflected version of the signal can be a first reflected version of the signal. The antenna set can be configured to transmit a second transmitted version of the signal that is not successfully reflected (e.g., not reflected, not reflected with a significant enough strength, not reflected in a manner indicating presence of the non-uniformity 130, not reflected in a manner indicating a significant non-uniformity) as a second reflected version of the signal and thus is not received. The first transmitted version of the signal can be transmitted to a first position of the ground and the second transmitted version of the signal can be transmitted to a second position of the ground. Reception by the antenna set of the first reflected version indicates existence of the non-uniformity 130 at the first position and absence of reception by the antenna set of the second reflected version indicates absence of the non-uniformity 130 at the second position.

Figure 1E:
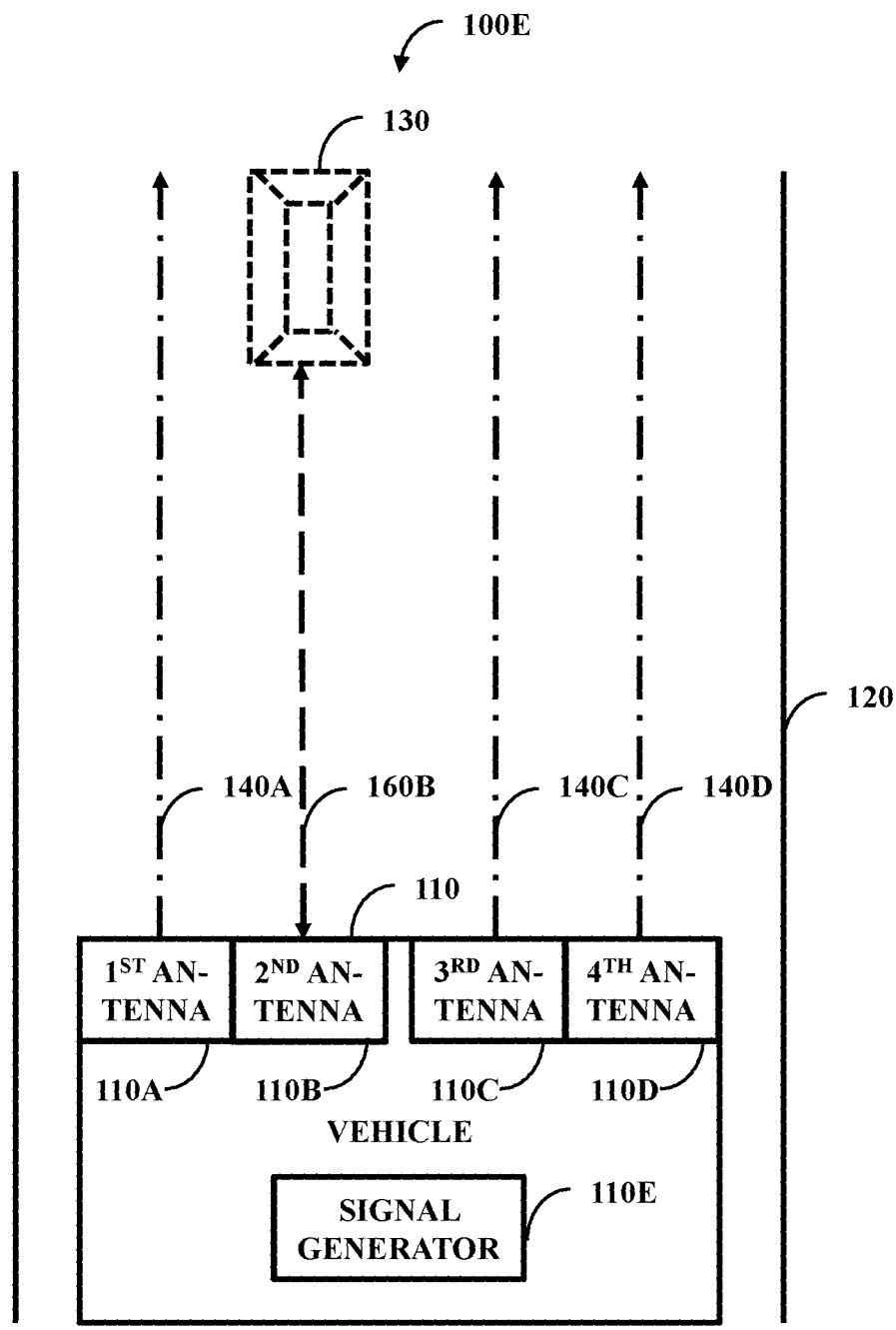

FIG. 1E illustrates one embodiment of four signals being transmitted 140A, 140B (160 being a combination of transmitted radio wave 140B and the reflected signal 150B), 140C, and 140D. The four transmitted signals can propagate along the surface 120. Three of the signals—140A, 140C, and 140D—can be such that they do not come into contact with the non-uniformity 130. Therefore, these signals can continue without being reflected in any meaningful way, if at all. However, the transmitted signal 140B can come into contact with the non-uniformity 130 and therefore have a reflected signal be returned as 150B. This can indicate that along the plane for the first antenna 110A, the third antenna 110C, and the fourth antenna 110D, there is no returned wave and therefore no non-uniformity, but along the plane for the second antenna 110B there is a returned wave and therefore the non-uniformity 130 exists.

With this information, a notification can be provided for a driver of the vehicle 110 regarding the non-uniformity 130. The notification can be a simple notification, such as a beeping noise. However, the notification can be more complex. In one example, a heads-up display or map can be employed for the vehicle 110 where a visual indicator is presented as the notification showing the driver a location of the non-uniformity. Additionally, further instruction can be provided as part of the notification. In one example, with FIG. 1E, tires can be under the vehicle 110 exclusively along at least part of planes of the first antenna 110A and the fourth antenna 110D. With this example, the non-uniformity 130 can be a pothole and the vehicle 110 can be an automobile. Since the non-uniformity 130 is along the plane of the second antenna 110B, the non-uniformity 130 will not impact the tires of the vehicle 110 if the vehicle 110 continues in a straight driving trajectory. Therefore, the notification can indicate to the drive to continue driving the vehicle 110 straight (or swerve if appropriate) to avoid the pothole.

In one embodiment, a stagger component can be part of the vehicle 110 and can be configured to stagger when the antenna set transmits the transmitted version of the signal and when the antenna set receives the reflected version of the signal. This staggering can be such that a timeframe when the antenna set transmits the transmitted version of the signal does not overlap (e.g., overlap at all or overlap in part) with when the antenna set receives the reflected version of the signal. The staggering can also be such that a timeframe when the antenna set receives the reflected version of the signal does not overlap (e.g., overlap at all or overlap in part) with when the antenna set transmits the transmitted version of the signal.

Figure 2:
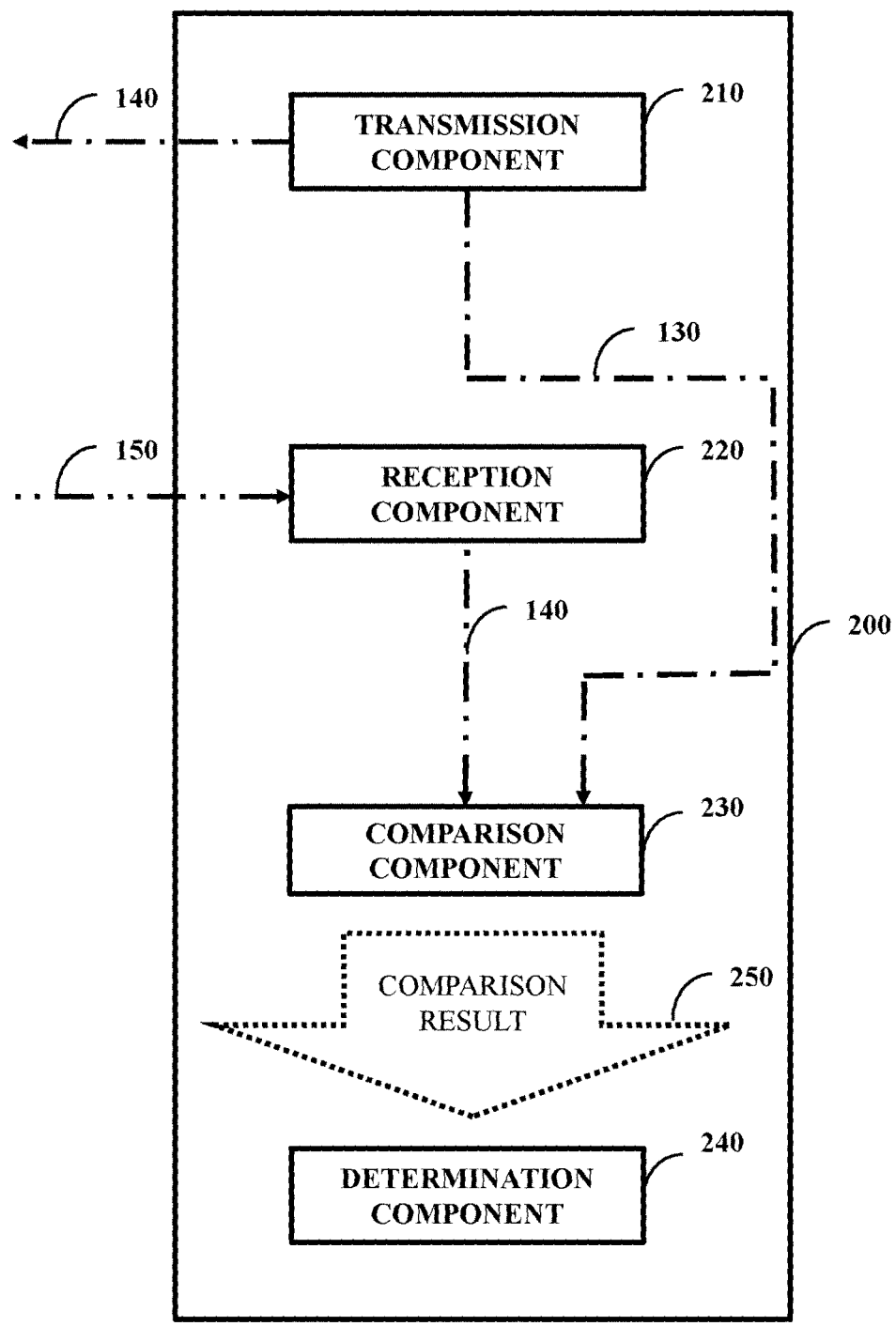
FIG. 2 illustrates one embodiment of a system comprising a transmission component, a reception component, a comparison component, and a determination component.

FIG. 2 illustrates one embodiment of a system 200 comprising a transmission component 210, a reception component 220, a comparison component 230, and a determination component 240. The transmission component 210 can be configured to transmit the transmission radio wave 140 (or non-radio wave) from the vehicle 110 of FIG. 1 (meaning at least one of FIGS. 1A-1E) toward the surface 120 of FIG. 1, upon which the vehicle 110 of FIG. 1 is travelling. The transmission component 210 can comprise an antenna used to transmit the transmission radio wave 140.

The reception component 220 can be configured to receive the reflected radio wave 150 (or non-radio wave) at the vehicle 110 of FIG. 1 from the surface 120 of FIG. 1. The reflected radio wave 150 is a reflection of the transmission radio wave 140 off the surface 120 of FIG. 1. In one embodiment, the reception component 220 uses the antenna used by the transmission component 210 for reception.

The comparison component 230 can be configured to compare the reflected radio wave 150 against the transmission radio wave 140 to produce a comparison result 250. The comparison component 230 can compensate for a difference between the waves 140 and 150 that is not based on the non-uniformity 130 of FIG. 1 and/or the surface 120 of FIG. 1. Examples of this can include compensation for movement of the vehicle 110 of FIG. 1, absorption by the surface 120 of FIG. 1, and/or interference. Compensation by the comparison component 230 can normalize the reflected wave 150 to the transmission wave 140 or vice versa. Once normalized, the comparison component 230 can make the comparison and produce the comparison result 250. In one example, this comparison can be finding differences between the transmission radio wave 140 and the reflected radio wave 150. These differences can be the comparison result 250 or no difference being found can be the comparison result 250.

The determination component 240 can be configured to determine if the surface 120 of FIG. 1 has the non-uniformity 130 of FIG. 1 through use of the comparison result 250. This can include determining if the non-uniformity 130 of FIG. 1 exists at all and/or if the non-uniformity 130 of FIG. 1 is a significant non-uniformity. In one example, if the comparison result 250 indicates that a difference exists, then the determination component 240 can determine that the non-uniformity 130 of FIG. 1 does exist. In this way, the system 200 can use the transmission radio wave 140 and the reflected radio wave 150 to determine existence of the non-uniformity 130 of FIG. 1.

The reflected radio wave 150 may be a distorted version of the transmitted wave 140 due to the reflection off the surface 120. A physical relationship, such as a mapping, can exist between the transmission radio wave 140 and the reflected radio wave 150. This physical relationship can be mathematically reconstructed by the determination component 240 (e.g., when implemented as a microcontroller or digital-signal processing system) and this reconstruction can be used in determining existence of the non-uniformity 130 of FIG. 1. The non-uniformity 130 of FIG. 1 can be a deviation from a flat nature of the surface 120.

The transmission radio wave 140 can comprise a first wave (e.g., the transmission radio wave 140A of FIGS. 1C and 1D) and a second wave (e.g., the transmission radio wave 140B of FIGS. 1C and 1D) transmitted in a divergent arrangement (e.g., transmitted at the same frequency or at different frequencies) to the surface 120. This divergent arrangement can be such that the first wave makes contact with the surface 120 of FIG. 1 at a first location and the second wave makes contact with the surface 120 of FIG. 1 at a second location that is different from the first location. Similarly, the reflected radio wave 150 can comprise a first reflected wave (e.g., the reflected radio wave 150A of FIGS. 1C and 1D) that is a reflection of the first wave from the surface 120 of FIG. 1 and a second reflected wave (e.g., the reflected radio wave 150B of FIGS. 1C and 1D) that is a reflection of the second wave from the surface 120 of FIG. 1. The comparison component 230 can be configured to compare the first reflected wave against the second reflected wave to produce the comparison result 250.

As part of production of the comparison result 250, comparison of the reflected waves against one another can be used to establish sample points for the surface 120 of FIG. 1. In one example, five editions of the transmission wave 140 (e.g. waves 140A-B as well as three other waves) of equal wavelength can be emitted. Their reflections can be received and compared against one another. If the five editions have the same wavelength, then their reflections should be about equal to one another if the surface 120 of FIG. 1 is flat (e.g., equal except for interference due to longer distances). If one of the five reflections is not about equal to the other reflections, then the comparison result 250 can reflect this non-equal nature and/or indicate that due to this non-equal nature, the non-uniformity 130 of FIG. 1 exists. This can also be done with different wavelengths with the comparison component 230 compensating for the different wavelengths (e.g., the five editions have different wavelengths from one another or three editions have one wavelength while the other two editions have a different wavelength). In one embodiment, the transmission component 210, the reception component 220, the comparison component 230, and the determination component 240 function as the identification component discussed above.

Figure 3:
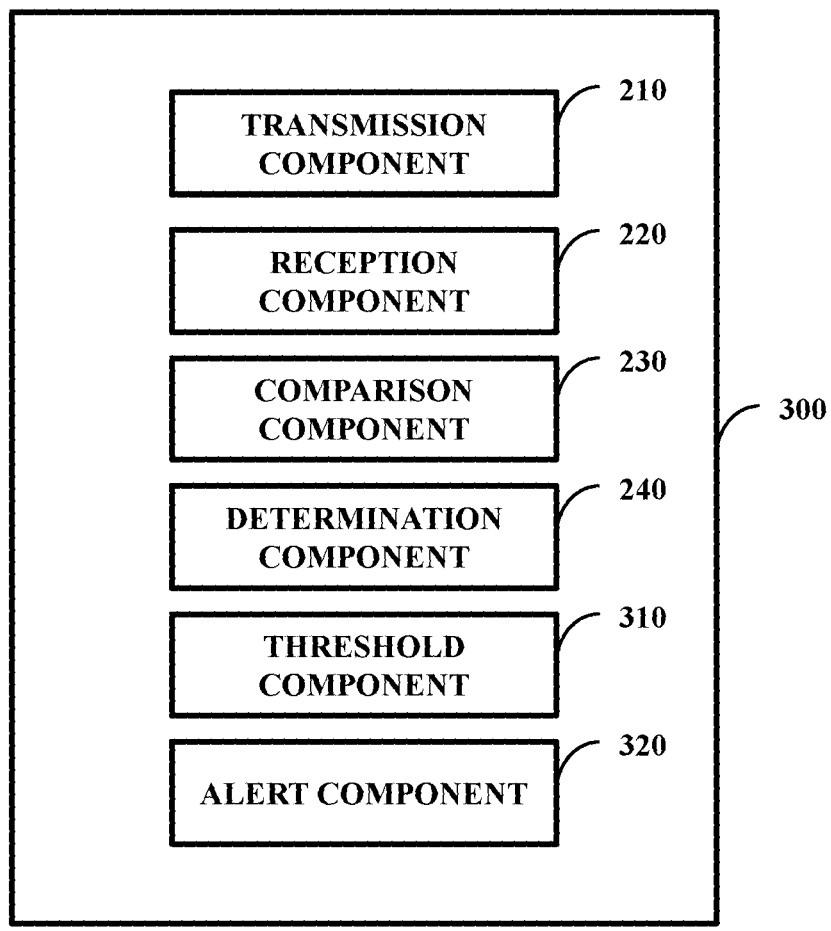
FIG. 3 illustrates one embodiment of a system comprising the transmission component, the reception component, the comparison component, the determination component, a threshold component, and an alert component.

FIG. 3 illustrates one embodiment of a system 300 comprising the transmission component 210, the reception component 220, the comparison component 230, the determination component 240, a threshold component 310, and an alert component 320. The threshold component 310 can be configured to determine if the non-uniformity 130 of FIG. 1 meets a threshold of significance. The alert component 320 can be configured to cause expression of an alert (e.g., flashing light and/or buzzer) to an occupant (e.g., driver or passenger) of the vehicle 110 of FIG. 1 when the non-uniformity 130 of FIG. 1 meets the threshold.

While a goal can be for the surface 120 of FIG. 1 to be completely uniform, the surface 120 can be produced with minor non-uniformities. These minor non-uniformities may be so small that they are unnoticeable to the occupant and/or have little impact on the vehicle 110 of FIG. 1. It can be irritating to the occupant to have frequent alerts, which can cause the occupant, when driving, to start to ignore alerts. The system 300 can function such that the occupant is alerted to significant non-uniformities while not being alerted to insignificant non-uniformities.

The non-uniformity 130 of FIG. 1 can be given a number (hereafter referred to as a non-uniformity number) by the threshold component 310. Examples that can be used in assigning this number can include peak height of the non-uniformity 130 of FIG. 1, size of the non-uniformity, or speed of the vehicle 110 of FIG. 1 (that infers a likely impact of the non-uniformity 130 of FIG. 1 on the occupant). The threshold can also be a number and the threshold component 310 can compare the threshold against the non-uniformity number. If the non-uniformity number meets the threshold (e.g., equals the threshold or exceeds the threshold), then the alert component 320 can cause expression of the alert (e.g., either one alert volume for existence of the non-uniformity 130 of FIG. 1 or the alert is louder the greater the deviation of the non-uniformity 130 of FIG. 1 from the surface 120 of FIG. 1). If the non-uniformity number does not meet the threshold (e.g., does not exceed the threshold), then the alert is not expressed by the alert component 320. In one embodiment, the threshold is the standard discussed above, the threshold component 310 is the standard component discussed above, and the alert component 320 is the notification component discussed above.

In one embodiment, the determination component 240 can be configured to identify the non-uniformity 130 of FIG. 1 through analysis of the reflected version and the alert component 320 can be configured to output a notification of the non-uniformity 130 of FIG. 1 of the ground after the non-uniformity 130 of FIG. 1 is identified. The threshold component 310 can be configured to determine if the non-uniformity 130 of FIG. 1 meets a threshold of significance. When the non-uniformity 130 of FIG. 1 meets the threshold of significance, the alert component 320 outputs the notification. Similarly, when the non-uniformity 130 of FIG. 1 does not meet the threshold of significance, the alert component 320 does not output the notification.

Figure 4:
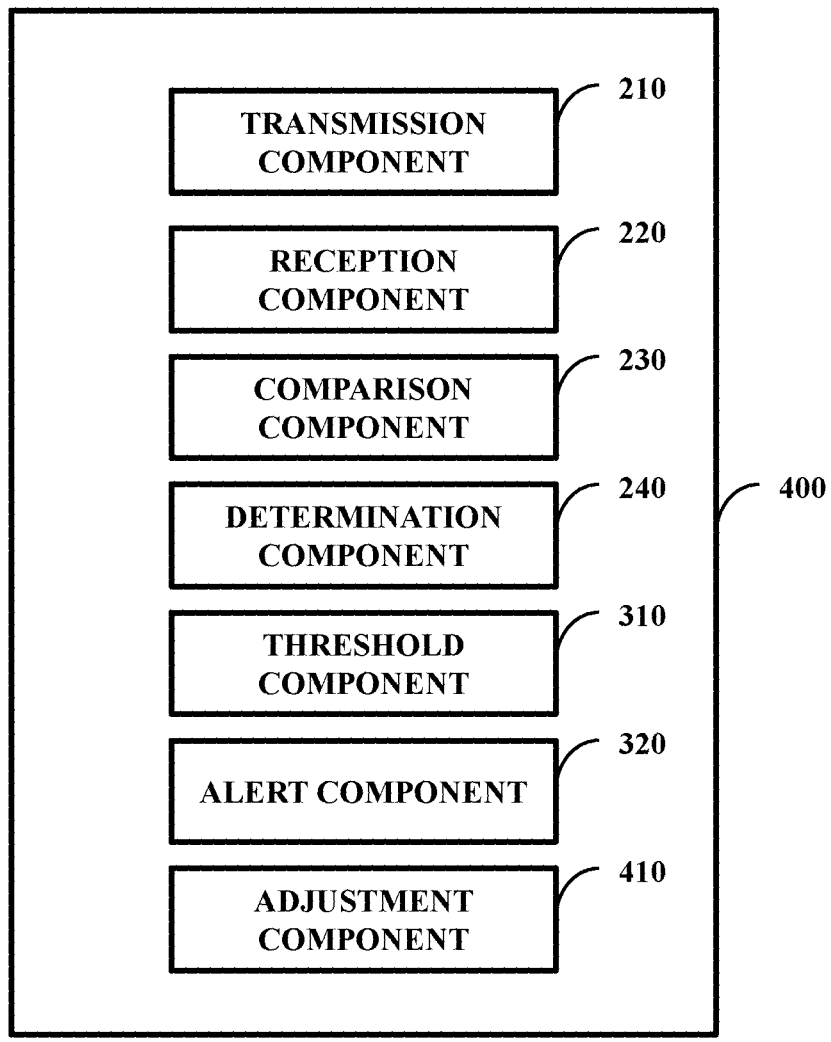
FIG. 4 illustrates one embodiment of a system comprising the transmission component, the reception component, the comparison component, the determination component, the threshold component, the alert component, and an adjustment component.

FIG. 4 illustrates one embodiment of a system 400 comprising the transmission component 210, the reception component 220, the comparison component 230, the determination component 240, the threshold component 310, the alert component 320, and an adjustment component 410. The adjustment component 410 can be configured to adjust the threshold of significance in response to an instruction from an occupant of the vehicle 110 of FIG. 1. The instruction can be entered into a graphical user interface of the vehicle 110 of FIG. 1, entered into a personal electronics device of the occupant, be spoken by the occupant, and then received by the vehicle 110 of FIG. 1 as a voice command, etc.

This can allow for the occupant, such as the driver, to customize alternative routes according his or her tolerance when driving. In one example, the driver can find too many false triggers causing alerts and in response the threshold should be changed. In one example, the initial threshold (e.g., plus-or-minus about two inches from about perfectly flat) can be set to a certain level as a factory preset. The driver, however, may find that the initial threshold is too sensitive and as such too many alerts are expressed. In view of this the driver can select for a new threshold (e.g., plus-or-minus about three inches from about perfectly flat). Therefore, the driver can select for the sensitivity to be lowered and this selection can cause the instruction that is from the occupant. Different driver and/or occupant profiles can be retained (e.g., by the vehicle 110 of FIG. 1) and loaded (e.g., when the adjustment component 410 identifies an appropriate profile).

In one embodiment, the adjustment component 410 can be configured to adjust the threshold of significance in response to something other than an instruction from the occupant. In one example, the alerts can be expressed at a variable volume such that the occupant can change the volume of the alerts. If the occupant keeps lowering the alert volume, the adjustment component 410 can infer (e.g., through employment of at least one artificial intelligence technique) that too many alerts are being sent and adjust the threshold of significance.

In one embodiment, the threshold of significance is a range with an upper bound and a lower bound and therefore meeting the threshold of significance can be falling within the upper and lower bound. In one example, the lower bound can for insignificant non-uniformities. With this, the non-uniformity 130 of FIG. 1 can be considered so small that a driver of the vehicle 110 is not anticipated to notice the non-uniformity 130 of FIG. 1. Further with this example, the upper bound can be for responses so large that they would not be considered non-uniformities. With this, the responses can be considered not the non-uniformity 130 of FIG. 1, but something else such as another vehicle. As an illustration of this example, a rock on a road can be large enough to be significant, but not as large as to be classified as outside of being considered a non-uniformity.

Figure 5:
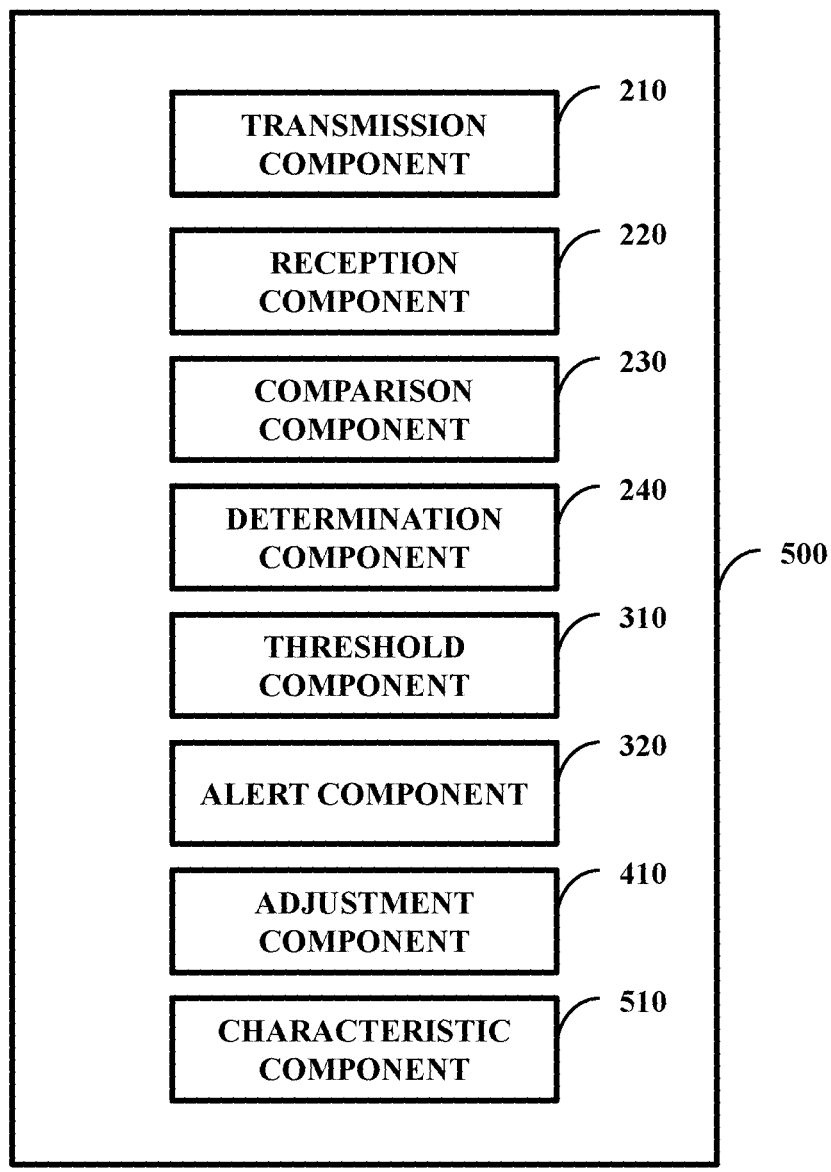
FIG. 5 illustrates one embodiment of a system comprising the transmission component, the reception component, the comparison component, the determination component, the threshold component, the alert component, the adjustment component, and a characteristic component.

FIG. 5 illustrates one embodiment of a system 500 comprising the transmission component 210, the reception component 220, the comparison component 230, the determination component 240, the threshold component 310, the alert component 320, the adjustment component 410, and a characteristic component 510. The characteristic component 510 can be configured to set a characteristic of the transmission radio wave based, at least in part, on the threshold of significance. The characteristic can be, in one example, the wavelength of the transmission radio wave 140 of FIG. 1. In this example, the lower the threshold and in turn the greater the sensitivity, then the shorter the wavelength.

The transmitted radio wave 140 of FIG. 1 can have well-defined characteristics that are measurably distorted by scattering and reflection. The wavelength of the transmitted radio wave 140 of FIG. 1 can be dependent on the dimension of the non-uniformities that the occupant wants to detect. If the occupant is travelling along smooth terrain, then the occupant can calibrate the system 500 to be notified of deviations greater than a certain level (e.g., plus about 3 inches and minus about 2 inches). With this, a shorter wavelength for the transmitted radio wave 140 of FIG. 1 can be used. If the occupant would like to detect larger deviations (e.g., plus-or-minus about 4 inches), then a longer wavelength for the transmitted radio wave 140 of FIG. 1 can be used. The transmitted radio wave 140 of FIG. 1 can be used to scan different kinds of non-uniformities (e.g., non-uniformities of different dimensions) using various transmission wavelengths. Further, the transmitted radio wave 140 of FIG. 1 can be used to scan different kinds of non-uniformities on different terrain types.

Figure 6:
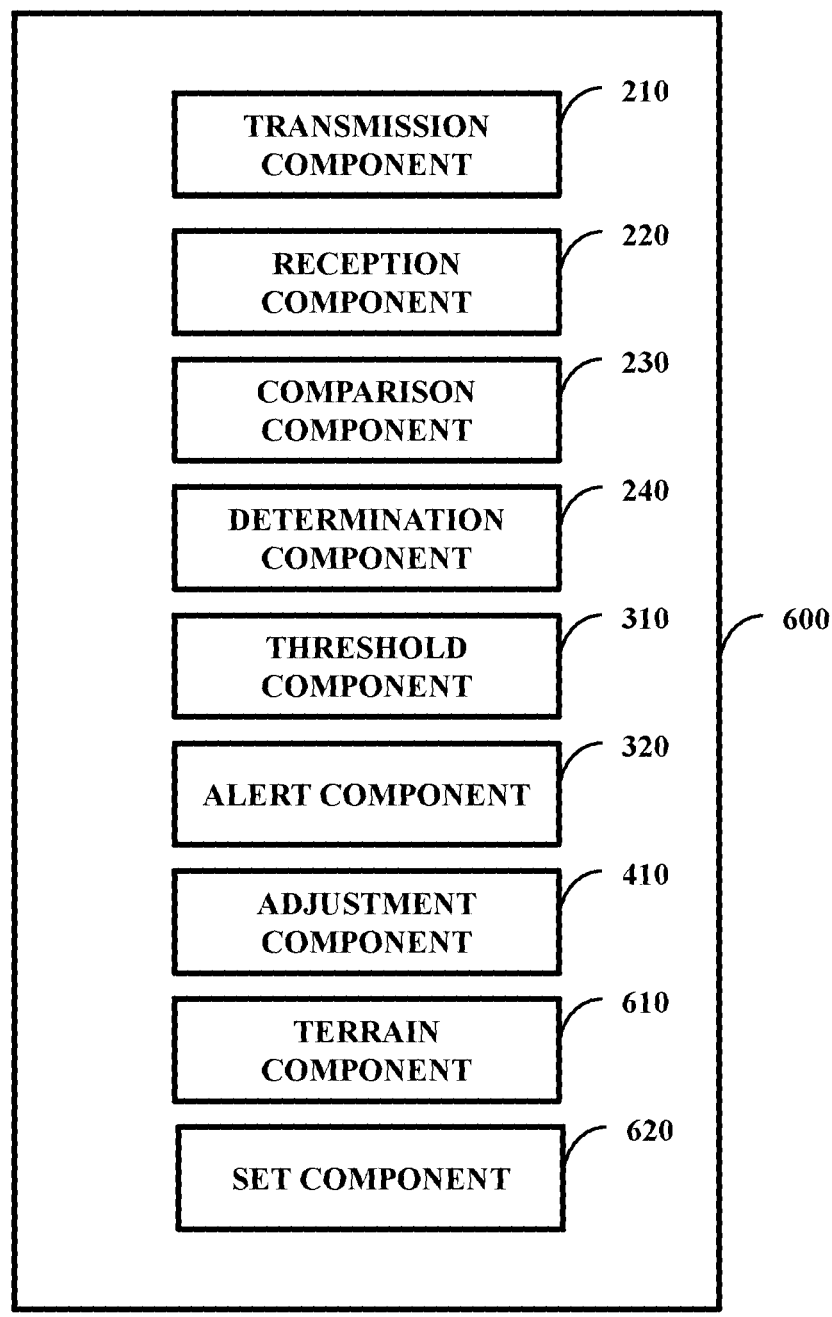
FIG. 6 illustrates one embodiment of a system comprising the transmission component, the reception component, the comparison component, the determination component, the threshold component, the alert component, the adjustment component, a terrain component, and a set component

FIG. 6 illustrates one embodiment of a system 600 comprising the transmission component 210, the reception component 220, the comparison component 230, the determination component 240, the threshold component 310, the alert component 320, the adjustment component 410, a terrain component 610, and a set component 620. The terrain component 610 can be configured to identify a terrain type of the surface 120 of FIG. 1. The set component 620 can be configured to set the threshold based, at least in part, on the terrain type.

Terrain type can cause differences in surface uniformity. An asphalt paved road is typically smoother than a gravel road. Having one threshold applying to both these roads may lead to undesirable results for at least one of the surfaces. Therefore, the terrain component 610 and set component 620 can function to give an appropriate value for the threshold based on the terrain type. Additionally, terrain type can be, for example, based on natural configuration (e.g., sand while on a beach or grass while in a field) and/or weather (e.g., snow and ice on a road causing the snow, ice, and pavement to be the surface 120 of FIG. 1)

The terrain component 610 can identify the terrain through various manners. In one example, the terrain component 610 can process the reflected radio waves 150A and 150B of FIG. 1. The terrain component 610 can compare these waves and determine if the surface is a rough type or a smooth type. One threshold can be set for the rough type and a different threshold can be set for the smooth type. In one example, the terrain component 610 can access a map database that includes terrain information (e.g., expressly includes the terrain information or includes photographs from which the terrain component 610 can ascertain the terrain type (e.g., the exact terrain type or a terrain classification)). In one example, the occupant can input the terrain type into the graphical user interface and the terrain component 610 can read this input for the identification.

Figure 7:
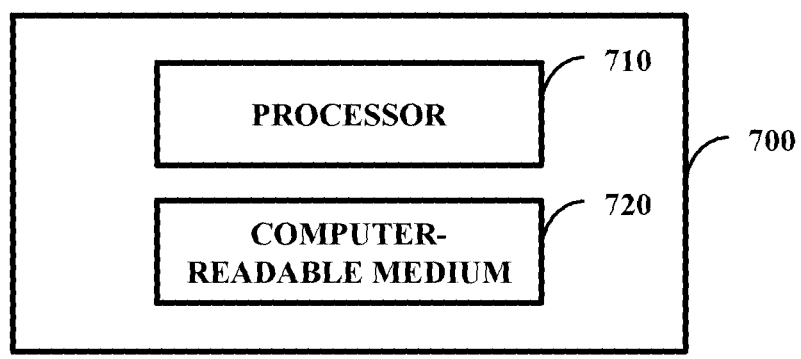
FIG. 7 illustrates one embodiment of a system comprising a processor and a non-transitory computer-readable medium.

FIG. 7 illustrates one embodiment of a system 700 comprising a processor 710 and a non-transitory computer-readable medium 720. The processor 710 can function as a microprocessor and/or the system 700 can function as a digital-signal processing system and at least one of these can execute calculations to solve mathematical mapping between the transmitted radio wave 140 of FIG. 1 and the reflected radio wave 150 of FIG. 1. The system 700 can include a radio-frequency transmission component and radio-frequency reception component for transmission and reception of the radio waves 140 and 150, both of FIG. 1, respectively. The system 700 can receive calibration settings from the occupant for the threshold and retain those settings in the computer-readable medium 720.

In one embodiment, the computer-readable medium 720 is communicatively coupled to the processor 710 and stores a command set executable by the processor 710 to facilitate operation of at least one component disclosed herein (e.g., the alert component 320 of FIG. 3 or the stagger component disclosed herein). In one embodiment, at least one component disclosed herein (e.g., the terrain component 610 of FIG. 6, the timer component disclosed herein, the regulation component disclosed herein, the identification component disclosed herein, the standard component disclosed herein, or the notification component disclosed herein) can be implemented, at least in part, by way of non-software, such as implemented as hardware by way of the system 700. In one embodiment, the computer-readable medium 720 is configured to store processor-executable instructions that when executed by the processor 710 cause the processor 710 to perform a method disclosed herein (e.g., the methods 800-1300 addressed below).

Figure 8:
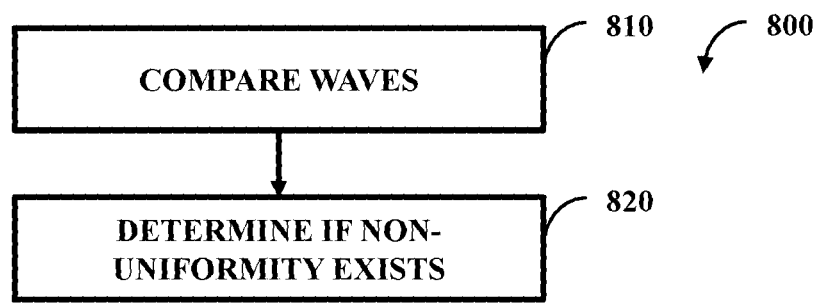
FIG. 8 illustrates one embodiment of a method comprising two actions.

FIG. 8 illustrates one embodiment of a method 800 comprising two actions 810-820. In one embodiment, the method 800 can function with regard to FIGS. 1C and 1D. At 810 the first reflected radio wave 150A of FIG. 1 can be compared against the second reflected radio wave 150B of FIG. 1 to produce a comparison outcome. The first reflected radio wave 150A of FIG. 1 can be the first transmitted radio wave 140A of FIG. 1 reflected from the surface 120 of FIG. 1 to the vehicle 110 of FIG. 1. Similarly, the second reflected radio wave 150B of FIG. 1 can be the second transmitted radio wave 140B of FIG. 1 reflected from the surface 120 of FIG. 1 to the vehicle 110 of FIG. 1. The transmitted radio waves 150A and 150B of FIG. 1 can be of the same wavelength or be of different wavelengths. Along with comparing reflected radio waves against one another, 810 can include comparing the first transmitted radio wave 140A of FIG. 1 against the first reflected radio wave 150A of FIG. 1 to produce the comparison outcome and/or comparing the second transmitted radio wave 140B of FIG. 1 against the second reflected radio wave 150B to produce the comparison outcome. At 820 a determination can be made on if the surface 120 of FIG. 1 has the non-uniformity 130 of FIG. 1 through use of the comparison outcome.

In one embodiment, the method 800 can function with regard to FIGS. 1A and 1B. At 810 the transmitted radio wave 140 of FIG. 1 (e.g., of a single transmission wavelength) that can be transmitted from the vehicle 110 of FIG. 1 to the surface 120 of FIG. 1 is compared against the reflected radio wave 150 of FIG. 1 that can be reflected from the surface 120 of FIG. 1 to the vehicle 110 of FIG. 1 to produce a comparison conclusion. At 820 there can be determining if the surface 120 of FIG. 1 has the non-uniformity 130 of FIG. 1 through use of the comparison conclusion.

Figure 9:
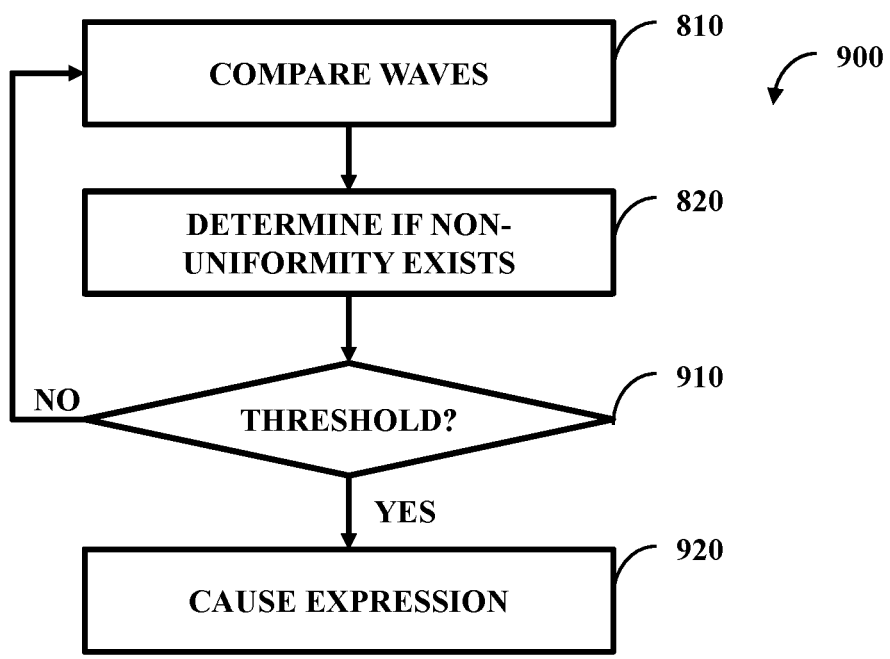
FIG. 9 illustrates one embodiment of a method comprising four actions.

FIG. 9 illustrates one embodiment of a method 900 comprising four actions 810-820 and 910-920. It can be determined, at 820, that the non-uniformity 130 of FIG. 1 exists, and then there can be, at 910, determining if the non-uniformity 130 of FIG. 1 meets a threshold of significance. When the non-uniformity 130 of FIG. 1 meets the threshold of significance the method 900 can proceed to 920, where causing expression of the alert to the occupant of the vehicle 110 of FIG. 1 occurs. When the non-uniformity does not meet the threshold of significance the method 900 can return to 810 to compare other waves.

Figure 10:
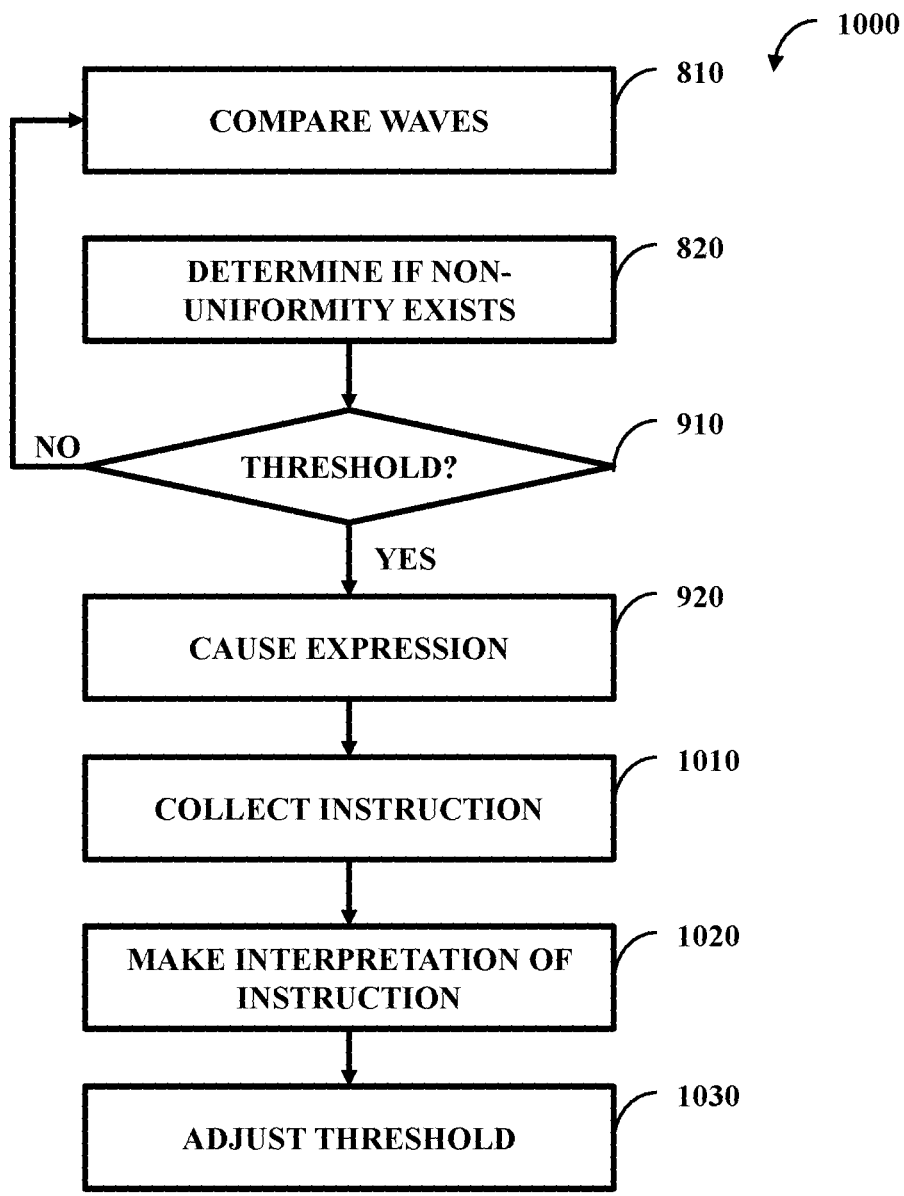
FIG. 10 illustrates one embodiment of a method comprising seven actions.

FIG. 10 illustrates one embodiment of a method 1000 comprising seven actions 810-820, 910-920, and 1010-1030. After the expression is caused at 920, an instruction can be sent that the threshold should change and this instruction can be collected at 1010. The instruction can be interpreted at 1020 and in accordance with this interpretation the threshold can be adjusted at 1030.

Figure 11:
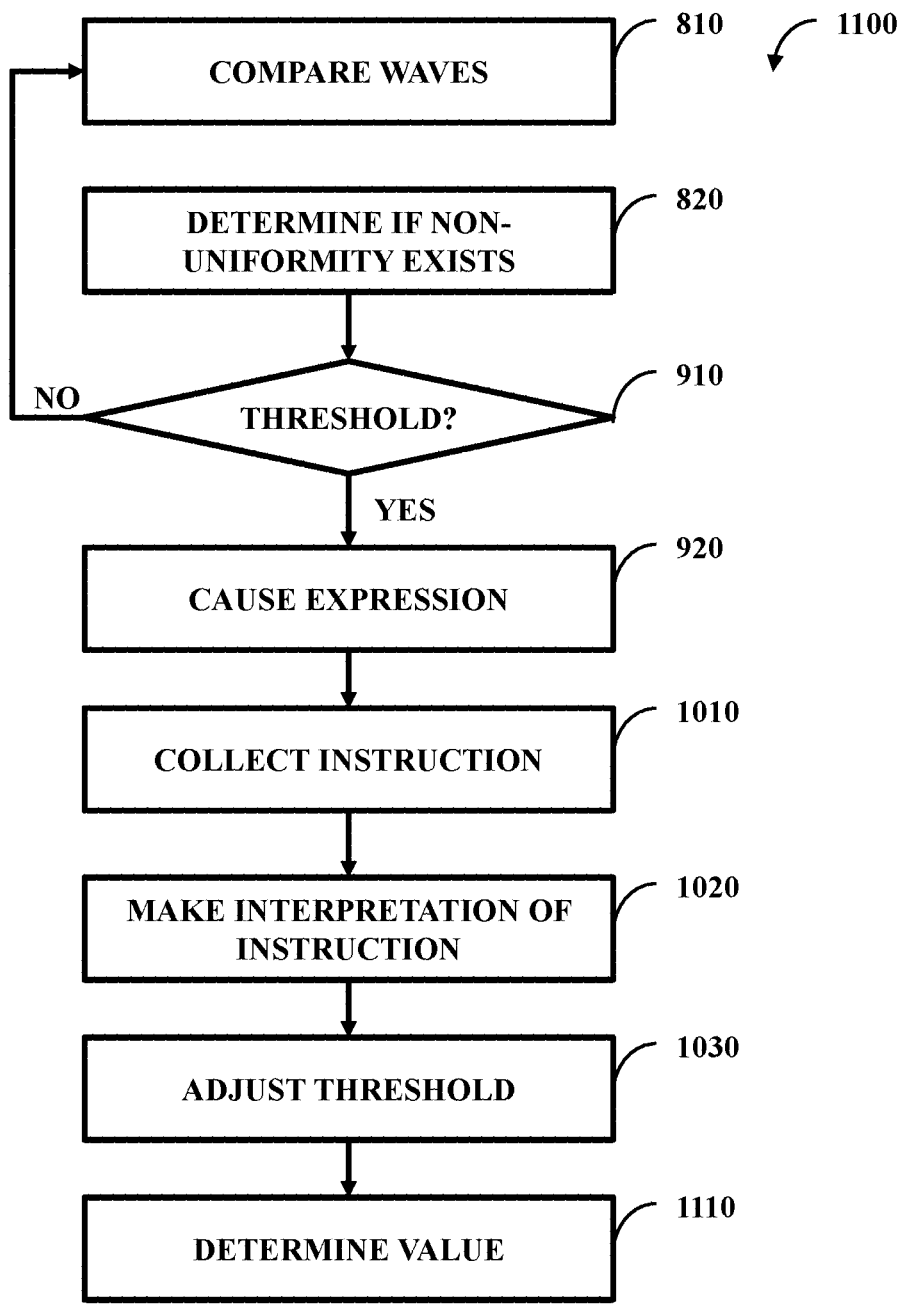
FIG. 11 illustrates one embodiment of a method comprising eight actions.

FIG. 11 illustrates one embodiment of a method 1100 comprising eight actions 810-820, 910-920, 1010-1030, and 1110. At 1110 there is determining a value of the single transmission wavelength. This determination can be based, at least in part, on the threshold after adjustment. The transmitted radio wave 140 of FIG. 1 can be transmitted from the vehicle 110 of FIG. 1 to the surface 120 of FIG. 1 with the value. This transmission can be part of the method 1100, such as part of the wave comparison 810.

While shown as being part of one seamless method 1100, actions 1010, 1020, 1030, and 1110 (as well as other actions disclosed herein) can function independently. In one example, the instruction can be produced and collected at 1010 before expression of the alert. In this example, the driver of the vehicle 110 of FIG. 1 can input the instruction (e.g., turn off the alerts entirely) upon purchasing a new vehicle. The instruction can be interpreted and the threshold can be adjusted to a value that is essentially infinity (interpreted by the vehicle 110 of FIG. 1 as infinity and as such, the threshold cannot be met) at 1030 and/or the value can be set to zero such that the transmitted radio wave 140 of FIG. 1 is not transmitted.

Figure 12:
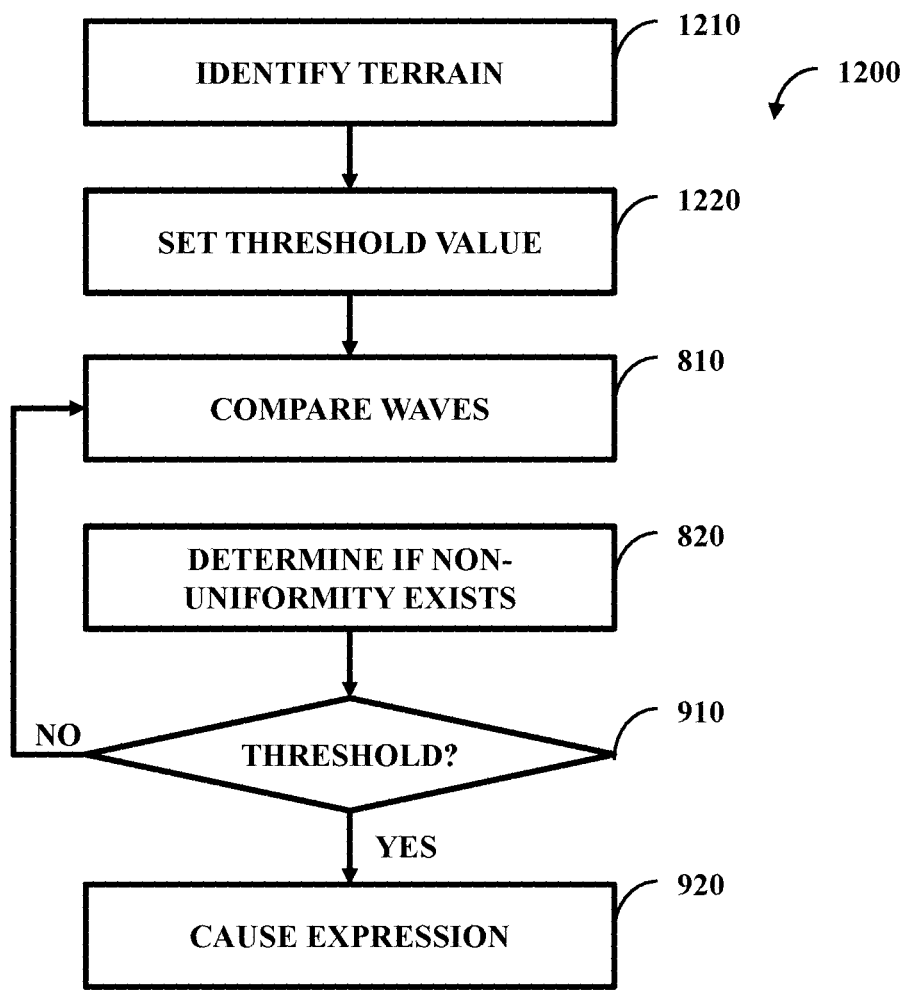
FIG. 12 illustrates one embodiment of a method comprising six actions.

FIG. 12 illustrates one embodiment of a method 1200 comprising six actions 810-820, 910-920, and 1210-1220. At 1210 the terrain type of the surface 120 of FIG. 1 can be identified. At 1220 the value of the threshold can be set based, at least in part, on the terrain type.

Figure 13:
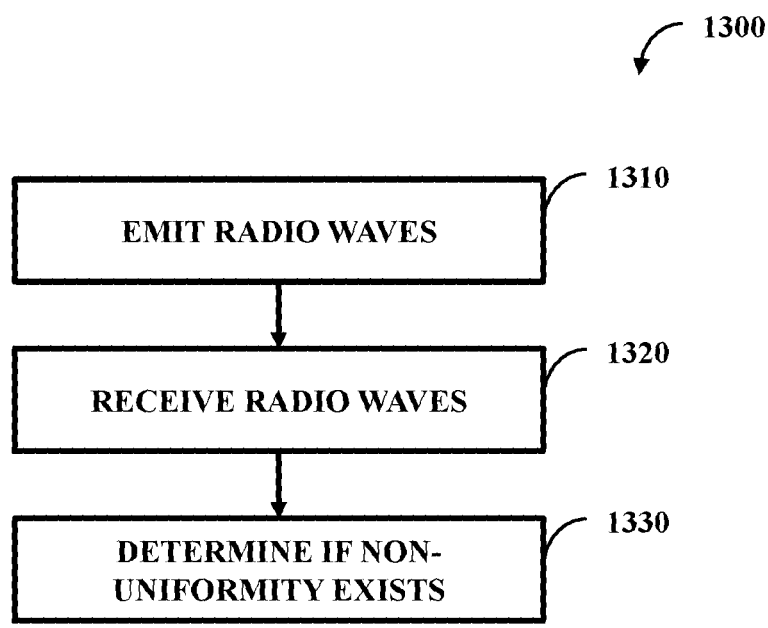
FIG. 13 illustrates one embodiment of a method comprising three actions.

FIG. 13 illustrates one embodiment of a method 1300 comprising three actions 1310-1330. Actions 1310-1330 can be performed by a vehicle device (e.g., hardware of the vehicle 110 of FIG. 1 or a personal electronic device, such as a cellular telephone) of a driver of the vehicle 110 of FIG. 1) while on the vehicle 110 of FIG. 1 and while the vehicle 110 of FIG. 1 is travelling upon the surface 120 of FIG. 1 (e.g., the vehicle 110 of FIG. 1 is an automobile in drive, but stopped at a stop light). At 1310, emitting a first incident radio wave that propagates along the surface 120 of FIG. 1 and emitting a second incident radio wave that propagates along the surface 120 of FIG. 1 occurs (e.g., emitting two or more incident radio waves). This emission can be at different locations of the surface 120 of FIG. 1, such as what is illustrated in FIG. 1C. Along with emitting these incident radio waves, 1310 can include generating these radio waves (e.g., selecting a frequency for the waves). At 1320, after emission of the respective waves, receiving a first reflected radio wave that is a reflection of the first incident radio wave takes place as well as receiving a second reflected radio wave that is a reflection of the first incident radio wave (e.g., receiving reflections of two or more incident radio waves). At 1330, determining if the surface 120 of FIG. 1 has the non-uniformity 130 of FIG. 1 through use of the first incident radio wave, the second incident radio wave, the first reflected radio wave, and the second reflected radio wave (e.g., determining begins after both reflected radio waves are received or determining beings after one reflected wave is received and continues as another reflected wave is received) occurs.

In one embodiment, more than two waves can be emitted and returned, such as a third incident (and reflected) radio wave and a fourth incident (and reflected) radio wave. These waves can be used to determine if the surface 120 of FIG. 1 has the non-uniformity 130 of FIG. 1. However, different waves being sent out can be staggered. In one embodiment, the third and fourth incident radio waves are emitted after the first and second reflected radio waves are received. Therefore, a set of waves is sent out, responses are collected, and then a second set of waves is sent out and subsequently collected. This second wave set can be sent out, as examples, due to more information being requested (e.g., waves returning inconclusive regarding whether the non-uniformity 130 of FIG. 1 exists) or due to a desired number of waves not being able to be sent out before initial return begins. In one example, once radio waves are sent and their responses are collected (e.g., within a specified cut-off time) processing can begin by a transmit-receive procedure (e.g., using aspects in a pulsed radar system). These waves can be sent out at a specific frequency (or frequencies) such that propagation characteristics of the waves are more suited to ground-based propagation. That is, the waves will follow a path of propagation along the ground, with the ground itself acting as a waveguide substrate (e.g., medium by which the waves can travel). By having along the ground propagation (e.g., near ground propagation) the radio waves would not be easily reflected when they are incident upon another vehicle, tires, obstructions, etc. The radio waves would also be unaffected (in the ideal sense) or minimally affected by precipitation or ice on the ground or other hazards (e.g., weather-based hazards). Radio waves can be generated and emitted at a frequency to cause the radio waves to stay on the ground during the course of their propagation and detect the surface that avoid at least some obstructions (e.g., automobile rear fenders) that are above or below the ground. A component (e.g., the transmission component 210 of FIG. 2) can be used to select the frequency based on a driving condition, terrain, etc. This component can make a compromise between longer-wavelength radio frequency (RF) and shorter-wavelength RF, since the longer-wavelength RF tends to travel in closer proximity to the ground, while the shorter-wavelength RF can be desirable for detection of smaller feature sizes. In one example, the terrain component 610 of FIG. 6 can determine that the vehicle 110 of FIG. 1 is travelling along a gravel road. Since small pebbles will want to be ignored as non-uniformities due to their frequency on such a road, a longer-wavelength RF can be selected allowing the radio waves to travel better along the gravel road.

While the methods disclosed herein are shown and described as a series of blocks, it is to be appreciated by one of ordinary skill in the art that the methods are not restricted by the order of the blocks, as some blocks can take place in different orders. Similarly, a block can operate concurrently with at least one other block.

What is claimed is:
1. A method, comprising:
 emitting a first incident radio wave that propagates along a surface; and
 emitting a second incident radio wave that propagates along the surface;
 emitting a third incident radio wave that propagates along the surface;

emitting a fourth incident radio wave the propagates along the surface;
receiving a first reflected radio wave that is a reflection of the first incident radio wave;
receiving a second reflected radio wave that is a reflection of the second incident radio wave;
receiving a third reflected radio wave that is a reflection of the third incident radio wave;
receiving a fourth reflected radio wave that is a reflection of the fourth incident radio wave; and
determining if the surface has the non-uniformity through use of the first incident radio wave, the second incident radio wave, the third incident radio wave, the fourth incident radio wave, the first reflected radio wave, the second reflected radio wave, the third reflected radio wave, and the fourth reflected radio wave,
where the first reflected radio wave is received after the first incident radio wave is emitted and after the second incident radio wave is emitted,
where the second reflected radio wave is received after the first incident radio wave is emitted and after the second incident radio wave is emitted,
where the third incident radio wave is emitted after the first reflected radio wave is received and after the second reflected radio wave is received,
where the fourth incident radio wave is emitted after the first reflected radio wave is received and after the second reflected radio wave is received,
where the third reflected radio wave is received after emission of the third incident radio wave and the fourth incident radio wave, and
where the fourth reflected radio wave is received after emission of the third incident radio wave and the fourth incident radio wave.

2. The method of claim 1,
where determining if the surface has the surface non-uniformity begins after receiving the first reflected radio wave that is the reflection of the first incident radio wave and
where determining if the surface has the surface non-uniformity begins after receiving the second reflected radio wave that is the reflection of the first incident radio wave.

3. The method of claim 2,
where determining if the surface has the surface non-uniformity begins after receiving the third reflected radio wave that is the reflection of the third incident radio wave and
where determining if the surface has the surface non-uniformity begins after receiving the fourth reflected radio wave that is the reflection of the fourth incident radio wave.

4. The method of claim 1, comprising:
generating the first incident radio wave; and
generating the second incident radio wave,
where the generating, emitting, receiving, and determining are performed by a vehicle device while on a vehicle travelling upon the surface.

5. The method of claim 4, comprising
generating the third incident radio wave; and
generating the fourth incident radio wave,
where the generating the third incident radio wave and generating the fourth incident radio wave are performed by the vehicle device.

6. The method of claim 1,
where the first incident radio wave that propagates along the surface is emitted to a first location of the surface,
where the second incident radio wave that propagates along the surface is emitted to a second location of the surface, and
where the first location and the second location are different locations.

7. The method of claim 6,
where the third incident radio wave that propagates along the surface is emitted to a third location of the surface,
where the fourth incident radio wave that propagates along the surface is emitted to a fourth location of the surface, and
where the first location, the second location, the third location, and the fourth location are different locations.

8. The method of claim 7,
where the first incident radio wave, the second incident radio wave, the third incident radio wave, and the fourth incident radio wave are about the same frequency.

9. The method of claim 1,
where the first incident radio wave that propagates along the surface is emitted to a first location of the surface,
where the second incident radio wave that propagates along the surface is emitted to the first location of the surface, and
where the first incident radio wave that propagates along a surface is emitted at a first frequency,
where the second incident radio wave that propagates along a surface is emitted at a second frequency, and
where the first frequency and the second frequency are different frequencies.

10. The method of claim 9,
where the third incident radio wave that propagates along the surface is emitted to a second location of the surface,
where the fourth incident radio wave that propagates along the surface is emitted to the second location of the surface,
where the third incident radio wave that propagates along a surface is emitted at a third frequency,
where the fourth incident radio wave that propagates along a surface is emitted at a fourth frequency, and
where the third frequency and the fourth frequency are different frequencies.

11. A non-transitory computer-readable medium configured to store processor-executable instructions that when executed by the processor cause the processor to perform a method, the method comprising:
causing an emission of a first incident radio wave that propagates along a surface such that a first reflected radio wave that is a reflection of the first incident radio wave is received;
causing an emission of a second incident radio wave that propagates along the surface such that a second reflected radio wave that is a reflection of the second incident radio wave is received;
causing an emission of a third incident radio wave that propagates along the surface such that a third reflected radio wave that is a reflection of the third incident radio wave is received;
causing an emission of a fourth incident radio wave that propagates along the surface such that a fourth reflected radio wave that is a reflection of the fourth incident radio wave is received; and
determining if the surface has the non-uniformity through use of the first incident radio wave, the second incident radio wave, the third incident radio wave, the fourth incident radio wave, the first reflected radio wave, the second reflected radio wave, the third reflected radio wave, and the fourth reflected radio wave, where the first reflected radio wave is received after the first incident radio wave is emitted and after the second incident radio wave is emitted, where the second reflected radio wave is received after the first incident radio wave is emitted and after the second incident radio wave is emitted, where the third incident radio wave is emitted after the first reflected radio wave is received and after the second reflected radio wave is received, where the fourth incident radio wave is emitted after the first reflected radio wave is received and after the second reflected radio wave is received, where the third reflected radio wave is received after emission of the third incident radio wave and the fourth incident radio wave, and where the fourth reflected radio wave is received after emission of the third incident radio wave and the fourth incident radio wave.

12. The non-transitory computer-readable medium of claim 11,
where determining if the surface has the surface non-uniformity begins after receiving the first reflected radio wave that is the reflection of the first incident radio wave,
where determining if the surface has the surface non-uniformity begins after receiving the second reflected radio wave that is the reflection of the first incident radio wave,
where determining if the surface has the surface non-uniformity begins after receiving the third reflected radio wave that is the reflection of the third incident radio wave, and
where determining if the surface has the surface non-uniformity begins after receiving the fourth reflected radio wave that is the reflection of the fourth incident radio wave.

13. The non-transitory computer-readable medium of claim 11,
where the causing of the emissions and the determining are performed by a vehicle device while on a vehicle travelling upon the surface.

14. The non-transitory computer-readable medium of claim 11,
where the first incident radio wave that propagates along the surface is caused to be emitted to a first location of the surface,
where the second incident radio wave that propagates along the surface is caused to be emitted to a second location of the surface,
where the third incident radio wave that propagates along the surface is caused to be emitted to a third location of the surface,
where the fourth incident radio wave that propagates along the surface is caused to be emitted to a fourth location of the surface, and
where the first location, the second location, the third location, and the fourth location are different locations.

15. The non-transitory computer-readable medium of claim 11,
where the first incident radio wave that propagates along the surface is emitted to a first location of the surface,
where the second incident radio wave that propagates along the surface is emitted to the first location of the surface, where the third incident radio wave that propagates along the surface is emitted to a second location of the surface,
where the fourth incident radio wave that propagates along the surface is emitted to the second location of the surface,
where the first incident radio wave that propagates along a surface is emitted at a first frequency,
where the second incident radio wave that propagates along a surface is emitted at a second frequency,
where the third incident radio wave that propagates along a surface is emitted at a third frequency,
where the fourth incident radio wave that propagates along a surface is emitted at a fourth frequency,
where the first frequency and the second frequency are different frequencies,
where the third frequency and the fourth frequency are different frequencies, and
where the first location and the second location are different locations.

16. A processor configured to execute an instruction set such that a method is performed, the method comprising:
causing a transmission of a first incident radio wave that propagates along a surface such that a first reflected radio wave that is a reflection of the first incident radio wave is received;
causing a transmission of a second incident radio wave that propagates along the surface such that a second reflected radio wave that is a reflection of the second incident radio wave is received;
causing a transmission of a third incident radio wave that propagates along the surface such that a third reflected radio wave that is a reflection of the third incident radio wave is received;
causing a transmission of a fourth incident radio wave that propagates along the surface such that a fourth reflected radio wave that is a reflection of the fourth incident radio wave is received; and
determining if the surface has the non-uniformity through use of the first incident radio wave, the second incident radio wave, the third incident radio wave, the fourth incident radio wave, the first reflected radio wave, the second reflected radio wave, the third reflected radio wave, and the fourth reflected radio wave,
where the first reflected radio wave is received after the first incident radio wave is transmitted and after the second incident radio wave is transmitted,
where the second reflected radio wave is received after the first incident radio wave is transmitted and after the second incident radio wave is transmitted,
where the third incident radio wave is transmitted after the first reflected radio wave is received and after the second reflected radio wave is received,
where the fourth incident radio wave is transmitted after the first reflected radio wave is received and after the second reflected radio wave is received,
where the third reflected radio wave is received after the transmission of the third incident radio wave and the fourth incident radio wave, and
where the fourth reflected radio wave is received after the transmission of the third incident radio wave and the fourth incident radio wave.

17. The processor of claim 16,
where determining if the surface has the surface non-uniformity begins after receiving the first reflected radio wave that is the reflection of the first incident radio wave, where determining if the surface has the surface non-uniformity begins after receiving the second reflected radio wave that is the reflection of the first incident radio wave, where determining if the surface has the surface non-uniformity begins after receiving the third reflected radio wave that is the reflection of the third incident radio wave, and where determining if the surface has the surface non-uniformity begins after receiving the fourth reflected radio wave that is the reflection of the fourth incident radio wave.

18. The processor of claim 16,
where the causing of the transmissions and the determining are performed by a vehicle device while on a vehicle travelling upon the surface.

19. The processor of claim 16,
where the first incident radio wave that propagates along the surface is caused to be transmitted to a first location of the surface, where the second incident radio wave that propagates along the surface is caused to be transmitted to a second location of the surface, where the third incident radio wave that propagates along the surface is caused to be transmitted to a third location of the surface, where the fourth incident radio wave that propagates along the surface is caused to be transmitted to a fourth location of the surface, and where the first location, the second location, the third location, and the fourth location are different locations.

20. The processor of claim 16,
where the first incident radio wave that propagates along the surface is transmitted to a first location of the surface, where the second incident radio wave that propagates along the surface is transmitted to the first location of the surface, where the third incident radio wave that propagates along the surface is transmitted to a second location of the surface, where the fourth incident radio wave that propagates along the surface is transmitted to the second location of the surface, where the first incident radio wave that propagates along a surface is transmitted at a first frequency, where the second incident radio wave that propagates along a surface is transmitted at a second frequency, where the third incident radio wave that propagates along a surface is transmitted at the first frequency, where the fourth incident radio wave that propagates along a surface is transmitted at a second frequency, where the first frequency and the second frequency are different frequencies, and where the first location and the second location are different locations.

* * * * *